(12) United States Patent
Edge

(10) Patent No.: US 7,697,176 B2
(45) Date of Patent: Apr. 13, 2010

(54) METHOD AND APPARATUS FOR CHROMATIC ADAPTATION

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 194 days.

(21) Appl. No.: 11/958,590

(22) Filed: Dec. 18, 2007

(65) Prior Publication Data

US 2009/0153888 A1   Jun. 18, 2009

(51) Int. Cl.
*G03F 3/08* (2006.01)
(52) U.S. Cl. .................. 358/518; 358/1.9; 358/515; 358/535; 382/162; 382/167; 345/589; 345/593; 345/597; 345/600
(58) Field of Classification Search .............. None
See application file for complete search history.

(56) References Cited

U.S. PATENT DOCUMENTS

| | | | |
|---|---|---|---|
| 5,754,448 A | 5/1998 | Edge et al. | |
| 6,108,442 A | 8/2000 | Edge et al. | |
| 6,608,925 B1 | 8/2003 | Edge et al. | |
| 7,120,295 B2 | 10/2006 | Edge et al. | |
| 7,215,343 B2 | 5/2007 | Edge | |
| 7,313,273 B2 * | 12/2007 | Hu | 382/167 |
| 7,612,782 B2 * | 11/2009 | Kurumisawa et al. | 345/604 |
| 2003/0081060 A1 * | 5/2003 | Zeng et al. | 347/43 |
| 2004/0126012 A1 * | 7/2004 | Sakaida | 382/167 |
| 2005/0225562 A1 * | 10/2005 | Higgins et al. | 345/604 |
| 2005/0249402 A1 * | 11/2005 | Tin | 382/162 |
| 2006/0181723 A1 * | 8/2006 | Edge | 358/1.9 |
| 2007/0126754 A1 | 6/2007 | Edge | |
| 2007/0285684 A1 * | 12/2007 | Borg | 358/1.9 |

OTHER PUBLICATIONS

Interim Report to the Commission Internationale de 1 Eclairage, Zurich, 1955, on the National Physical Laboratory's investigation of colour-matching (1955); W.S. Stiles O.B.E., D. Sc., pp. 168-181.
N.P.L. coulour-matching investigation: Final Report (1958); by W.S. Stiles & J.M. Burch, National Physical Laboratory, Teddington, Middlesex, pp. 1-26.
The spectral sensitivity of the human short-wavelength sensitive cones derived from thresholds and color matches. Andrew Stockman, Lindsay T. Sharpe, Clemens Fach, Vision Research 39 (1999) 2901-2927.
Color Science: Concepts and Methods, Quantitative Data and Formulae, Wyszecki, Gunter, and Stiles, W.S., $2^{nd}$ Edition, John Wiley & Sons, NY 1982, Color-Matching Functions of Normal Trichromats, p. 345.
Color Appearance Models, Mark Fairchild, Addison-Wesley, Reading Mass., 1998, p. 192; Chapter 9—Chromatic-adaptation Models, pp. 199-214 & Chapter 10, Color Appearance Models, p. 221.

(Continued)

*Primary Examiner*—Mark K Zimmerman
*Assistant Examiner*—Miya J Cato
(74) *Attorney, Agent, or Firm*—Nelson Adrian Blish

(57) ABSTRACT

A method for performing chromatic adaptation includes performing chromatic adaptation wherein corrections to tristimulous values XYZ are maximized in the regions of white and neutral and are minimized in the vicinity of non-neutral regions of colors space via piecewise linear corrections in XYZ. In one embodiment, a selective linear correction is performed using three matrices one for each sector in an RGB color space. In an alternative embodiment, selective color adjustments are made and the adjustments are partitioned for each primary and secondary color.

15 Claims, 2 Drawing Sheets

OTHER PUBLICATIONS

Colour & Vision Research Laboratories, Institute of Ophthalmology, UCL Website, http://cvrl.ucl.ac.uk/.

The Reproduction of Colour, R.W.G. Hunt, Fountain Press, England, 5$^{th}$ Edition, 1995, Colour Standards and Calculations, p. 138-141; A Model of Colour Vision for Practical Applications; Evaluating Colour Appearance, p. 706-707.

International Color Consortium® Specification ICC.1:2004-10 (Profile Version 4.2.0.0) available at http://www.color.org.

Physiologically-based color matching functions, Andrew Stockman & Lindsay T. Sharpe, Institute of Ophthalmology, University College London; p. 1-2, ISCC/CIE Expert Symposium, May 16-17, 2006, National Research Council of Canada, Ottawa, Ontario, http://www.iscc.org/jubilee2006/.

* cited by examiner

METHOD AND APPARATUS FOR CHROMATIC ADAPTATION

FIELD OF THE INVENTION

The present invention relates generally to color management and more particularly to a method and apparatus for chromatic adaptation.

BACKGROUND OF THE INVENTION

Color management is a field of technology that relates to translating digital images from one media to another in order to preserve color appearance. The Commission Internationale de l'Éclairage (hereinafter "CIE") XYZ observer functions are the basis for most color measurements that require the matching of colors. By combining these functions with non-linear color appearance models (CAMs) such as CIELAB and CIECAM96s, complex color images as well as simple color patches can be reproduced with great success. It is well known that corrections to XYZ must be performed when the measured value of white between media or environments is different. Some illustrative examples of these cross-media conversions include:

1) Converting a Red-Green-Blue (RGB) image that has been optimally prepared on a display calibrated to D65 white to a CMYK file to be printed on neutral paper and viewed in a D50 light booth;
2) Converting a CMYK file optimized for neutral white paper to be printed on custom paper that is intentionally tinted a pastel blue or pink; and
3) Converting an image which was optimized for viewing in D50 illumination for viewing in office light illumination The type of technology that specifically addresses this topic is known as "chromatic adaptation". Chromatic adaptation provides a transformation from tristimulous values in one viewing condition to matching tristimulous values in a second set of viewing conditions. The "viewing condition" may be in one illustrative example the measured properties of the "white" illumination employed to view the images. However, more generally, "viewing condition" may be, for example, the measured value of white (RGB=100%) for a display system such as a computer monitor. For the purposes of this description, it is assumed that "viewing condition" is the adaptive "white point" of a scene that is being viewed. In the case of printed images on paper, the white point is the combined effect of illumination and reflective properties of the paper. In the example of images on a display, the white point is the maximum of red, green, blue (RGB=100% each or gray level 255, 255, 255) combined to yield the "whitest white" of the display system in a calibrated state.

Several methods of chromatic adaptation have been developed in the past. The most recent version of the International Color Consortium (ICC) specification specifically recommends a Bradford model as a simple, baseline method for performing chromatic adaptation (see section 6.2.1 of the ICC Specification ICC.1: 2004-10). This was a big step forward, since previous versions of the ICC specification only defined a primitive XYZ scaling as a baseline adaptation method (see 6.3.2 of the ICC Specification ICC.1: 2004-10). This method was adequately useful for conversions between CMYK media with slightly different paper color (i.e. up to 5 delta E in a*b*), but was quite unsatisfactory, as for example, for use in converting images from displays set at a D65 white point for purposes of displaying on a system with a D50 white point (i.e. a 20 delta E difference from D50). As discussed above, defining an effective method of chromatic adaptation is key for color conversions between media and environments with significant white point differences.

SUMMARY OF THE INVENTION

Briefly, according to one aspect of the present invention a method for performing chromatic adaptation corrections to tristimulous values XYZ are maximized in the regions of white and neutral and are minimized in the vicinity of non-neutral regions of colors space via piecewise linear corrections in XYZ.

In another embodiment of the invention, a system comprises a display and a controller coupled to the display, wherein the controller performs a chromatic adaptation that yields a color profile for the display wherein corrections to XYZ are maximized in the regions of white and neutral and are minimized in the vicinity of non-neutral regions of colors space using the following correction:

$$\overrightarrow{XYZ}_{adapt} = \overrightarrow{XYZ} + \Delta \overrightarrow{XYZ}(\overrightarrow{RGB})$$

$$= \overrightarrow{XYZ} + \sum_{i=0}^{i=5} \Delta \overrightarrow{XYZ}_i \left(1.0 - f_{corr}\left(\overrightarrow{RGB}, i\right)\right)$$

$$= M_{WP}\overrightarrow{RGB} + \sum_{i=0}^{i=5} (M_{D50} - M_{WP})\overrightarrow{RGB}_i \left(1.0 - f_{corr}\left(\overrightarrow{RGB}, i\right)\right)$$

$$\overrightarrow{RGB}_i = (1, 0, 0) \text{ for } i = 0$$
$$= (0, 1, 0) \text{ for } i = 1$$
$$= (0, 0, 1) \text{ for } i = 2$$
$$= (0, 1, 1) \text{ for } i = 3$$
$$= (1, 0, 1) \text{ for } i = 4$$
$$= (1, 1, 0) \text{ for } i = 5$$

where $M_{D50}$ is a matrix for converting RGB to XYZ for the display set to a white point of D50, and $M_{WP}$ is a matrix for converting RGB to XYZ for the display set to a white point of $XYZ_{WP}$.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
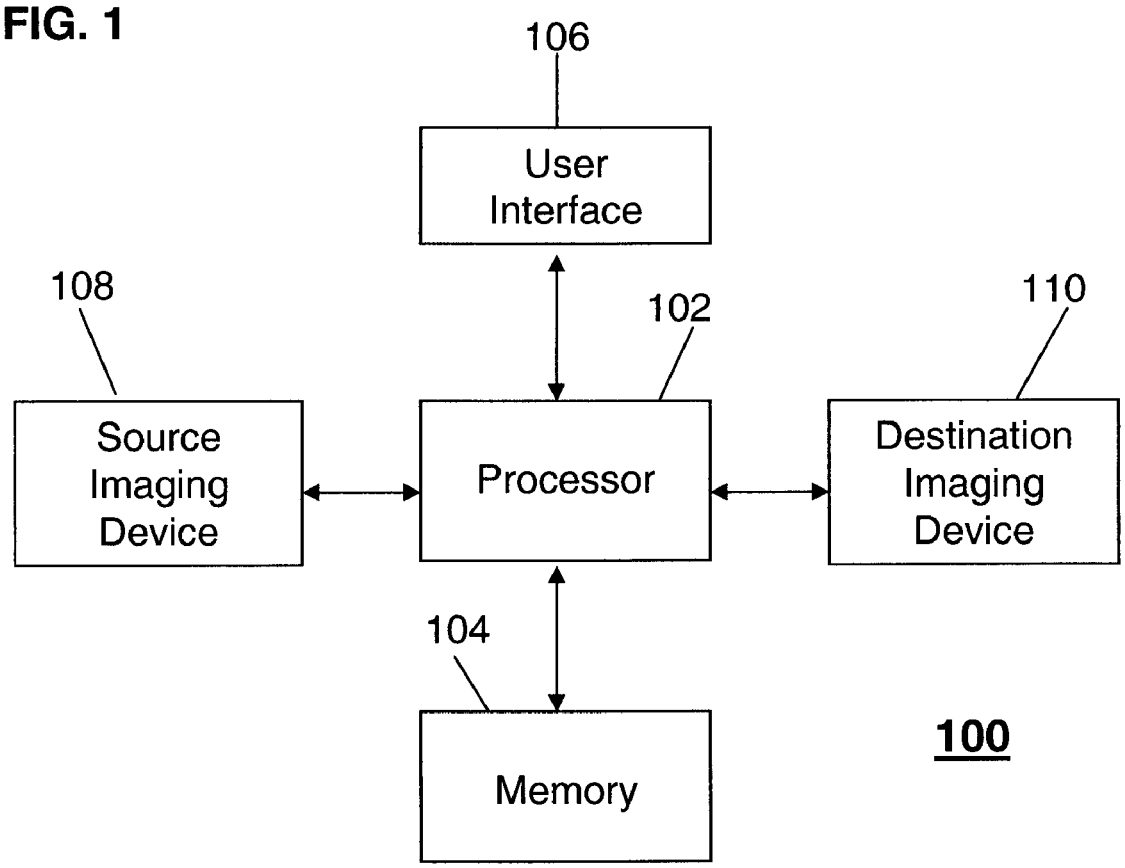
FIG. 1 shows a block diagram of a system in accordance with one embodiment of the invention.

The present description is directed in particular to elements forming part of, or cooperating more directly with, methods and/or apparatus in accordance with the invention. It is to be understood that elements not specifically shown or described may take various forms well known to those skilled in the art.

In one embodiment of the invention, a method of chromatic adaptation that appears to provide some improvements over prior art adaptation techniques will be described. Most modern chromatic-adaptation models can be traced back to the hypotheses proposed by Johannes von Kries, the modern interpretation of the von Kries hypothesis in terms of chromatic-adaptation model are expressed in Equations 1-3 as follows:

$$L_a = k_L L \quad \text{Eq. 1}$$

$$M_a = k_m M \quad \text{Eq. 2}$$

$$S_a = k_S S \quad \text{Eq. 3}$$

where L, M, and S represent the initial cone responses; $k_L$, $k_M$, and $k_S$, are the coefficients used to scale the initial cone signals (i.e. gain control); and $L_a$, $M_a$, and $S_a$ are the post-adaptation cone signals. Typically a matrix conversion is performed to convert from the XYZ human observer functions to long-medium-short (LMS) spectral sensitivities of the human eye, and the inverse of that matrix is then used to convert from $L_a M_a S_a$ to $X_a Y_a Z_a$.

The new method of chromatic adaptation described herein provides the simplicity and linearity of the above von Kries equations with some of the principles disclosed in previous patent applications U.S. Pat. No. 5,754,448, U.S. Pat. No. 6,108,442, U.S. Pat. No. 6,608,925, and U.S. Pat. No. 7,120,295 which are incorporated by reference as if fully disclosed herein.

All these previous techniques all share a common theme: the definition of reference white used to determine $k_L$, $k_M$, and $k_S$ in the von Kries equations above (i.e. the white reference vector $(X_n, Y_n, Z_n)$) should be a function of XYZ. For values of XYZ in the vicinity of neutral colors such as white and gray, $(X_n, Y_n, Z_n)$ should approach $(X_{wp}, Y_{wp}, Z_{wp})$ the measured white of the media or media+illumination combination. For values of XYZ in highly saturated regions of color, the $(X_n, Y_n, Z_n)$ should approach a standard neutral white such as D50.

One aspect of the invention has the advantage of characterizing and converting colors using a simple linear behavior of matrix transforms based on the von Kries equations above. At the same time, this invention helps to ensure that saturated colors are compared to a neutral reference white such as D50 and that non-saturated colors are compared to a media white reference. Whereas the previous inventions resulted in visual aberrations due to non-linear behavior, this invention has the property of linear or at least piecewise linear transitions between the aforementioned two extremes in the XYZ space.

In one embodiment, the invention includes a correction to account for what appears to be significant contamination in the blue tristimulous observer function $Z(\lambda)$. Whereas conventional matrix conversions between the cone responses LMS and the observer functions XYZ define $Z(\lambda)$ to be essentially equivalent to $S(\lambda)$, the blue or "short wavelength" cone response, this invention accounts for the possibility that $Z(\lambda)$ also contains a significant component from the medium wavelength cone response $M(\lambda)$ and possibly from the long wavelength $L(\lambda)$ as well. As a result of combining this correction for contamination of $Z(\lambda)$ with the linear chromatic adaptation method described below, excellent color reproduction can be achieved despite significant white point differences.

Assumptions of the Edge Chromatic Adaptation Method (ECA)

In one embodiment of the invention, that will be referred to as the Edge Chromatic Adaptation Method (ECA) for ease of discussion, a couple of assumptions are made as follows:

1) The first assumption is that when the human eye experiences a white point shift such as printing on blue paper or observing a display that is for example 9300K, colors in the vicinity of neutral must necessarily be compared to the white point of the media, scaled in a manner consistent with von Kries. If the non-neutral media white (MW) is measured to have a value of $XYZ_{MW}$, the generalized Von Kries adaptation to D50 may be described as follows:

$$\overrightarrow{XYZ_{adapt}} = M_{XYZ \rightarrow RGB}^{-1} \frac{M_{XYZ \rightarrow RGB} \overrightarrow{XYZ_{D50}}}{M_{XYZ \rightarrow RGB} \overrightarrow{XYZ_{MW}}} M_{XYZ \rightarrow RGB} \overrightarrow{XYZ} \quad \text{Eq. 4}$$

where $M_{XYZ \rightarrow RGB}$ is the matrix for converting XYZ to the preferred adaptation space, i.e. Bradford, Von Kries, etc. For simplicity of notation, the following mathematical convention is used:

$$\text{if } \vec{A} = \begin{pmatrix} A_0 \\ A_1 \\ A_2 \end{pmatrix} \text{ and } \vec{B} = \begin{pmatrix} B_0 \\ B_1 \\ B_2 \end{pmatrix} \quad \text{Eq. 5}$$

then $$\vec{A}\vec{B} = \begin{pmatrix} A_0 B_0 \\ A_1 B_1 \\ A_2 B_2 \end{pmatrix} \text{ and } \frac{\vec{A}}{\vec{B}} = \begin{pmatrix} A_0/B_0 \\ A_1/B_1 \\ A_2/B_2 \end{pmatrix}$$

For conversions of colors proportional to media white, $XYZ_{MW}$, (i.e. colors which are neutral relative to the media white), the conversion always results in values proportional to the measured value of D50 white, $XYZ_{D50}$ (i.e. colors which are neutral to D50 white) or to another neutral reference white value. The assumption is that the eye+brain system is normalizing the tristimulous values due to comparison with the media white. Essentially, if media white is blue-shifted relative to D50, its corrected value of XYZ must be yellow-shifted back to D50. All colors must shift in the yellow direction in order to preserve appearance because they will all be compared "relative" to the corrected media white. This normalization is reflected in the CIELAB expressions where all values of X, Y, and Z are normalized relative to XYZ of the defined white point. Thus, there is an overall scaling or shift of XYZ values in the direction of $XYZ_{D50}$ and away from $XYZ_{MW}$, which is most prominent in the vicinity of white and neutral colors.

2) The ECA approach however continues with a second assumption that differs from prior art techniques which is that colors that progressively differ from neutral are compared to absolute neutral white rather than to the shifted media white when they are observed. This means that the scaling correction from $XYZ_{MW}$ to $XYZ_{D50}$ is reduced for colors that are non-neutral. In terms relating to the generalized von Kries expression above, the value of the denominator approaches $XYZ_{D50}$ as colors progress from the media white to the outer limit of the color gamut that can be perceived by the human eye+brain. Thus for neutral colors (colors proportional to $XYZ_{MW}$):

$$\overrightarrow{XYZ_{adapt}} = M_{XYZ \rightarrow RGB}^{-1} \frac{M_{XYZ \rightarrow RGB} \overrightarrow{XYZ_{D50}}}{M_{XYZ \rightarrow RGB} \overrightarrow{XYZ_{MW}}} M_{XYZ \rightarrow RGB} \overrightarrow{XYZ} \quad \text{Eq. 6}$$

for $\overrightarrow{XYZ} \rightarrow \alpha \overrightarrow{XYZ_{MW}}$ wwhere $0 \leq \alpha \leq 1.0$ i.e. along the gray axis of RGB gamut. However for non-neutral colors:

$$\overrightarrow{XYZ}_{adapt} = \overrightarrow{XYZ} \text{ for } \overrightarrow{XYZ} \rightarrow \Sigma \alpha_i \overrightarrow{XYZ}_i \text{ where } i=r,g,b \quad \text{Eq. 7}$$

and $\alpha_i=0$ for i=r,g, or b (i.e. for XYZ on the gamut boundary).

In the above expression, $XYZ_i$ are the tristimulous values of the RGB space used for chromatic adaptation. The RGB space can either be that of a physical RGB device such as a display, a synthetic RGB space such as Adobe RGB, or a $\rho,\beta,\gamma$ cone space such as is often used for chromatic adaptation calculations.

Thus we replace the equation 4 above with a generalized expression:

$$\overrightarrow{XYZ}_{adapt} = M_{adapt}(\overrightarrow{XYZ})\overrightarrow{XYZ} \quad \text{Eq. 8}$$
where $$M_{adapt}(\overrightarrow{XYZ}) = M_{XYZ \rightarrow RGB}^{-1} \frac{M_{XYZ \rightarrow RGB}\overrightarrow{XYZ}_{D50}}{M_{XYZ \rightarrow RGB}\overrightarrow{XYZ}_{MW}} M_{XYZ \rightarrow RGB} \quad \text{Eq. 9}$$

for $\overrightarrow{XYZ} \rightarrow \alpha \overrightarrow{XYZ}_{MW}$ where $0 \leq \alpha \leq 1.0 = M_{XYZ \rightarrow RGB}^{-1} M_{XYZ \rightarrow RGB}$ $$= 1$$

for $\overrightarrow{XYZ} \rightarrow \sum \alpha_i \overrightarrow{XYZ}_i$ where i=r,g,b and $\alpha_i=0$ for r,g, or b (i.e. XYZ on the gamut boundary of the RGB space associated with matrix $M_{XYZ \rightarrow RGB}$).

Improved ECA Using Selective Color Adjustments in Linear RGB Space

In accordance with another embodiment of the invention, the selective linear RGB space correction technique makes the following assumptions:

1) There exists a baseline Matrix model for an RGB system which converts RGB→XYZ, in other words there exists an appropriate RGB space that is a linear transformation of the XYZ space;

2) That linear RGB space is to be corrected selectively for R, G, B, C, M, Y resulting in a defined $\Delta XYZ$ vector for each primary and secondary color;

3) The $\Delta XYZ$ corrections are linear in linear RGB space; and

4) The adjustments are partitioned such that the adjustment for R is minimum for R=1.0, G=B=0 and scales linearly to 1 as RGB approaches the boundaries R=0, R=G=B, R=G with B=0, and R=B with G=0. A similar partitioning occurs for the corrections for each primary and secondary color.

Thus the correction can be defined as follows:

$$\overrightarrow{XYZ}_{adapt} = \overrightarrow{XYZ} + \Delta \overrightarrow{XYZ}(\overrightarrow{RGB}) \quad \text{Eq. 10}$$

$$\Delta \overrightarrow{XYZ}(\overrightarrow{RGB}) = \sum_{i=0}^{i=5} \Delta \overrightarrow{XYZ}_i(1.0 - f_{corr}(\overrightarrow{RGB}, i))$$

define $C = 1 - R$, $M = 1 - G$, $Y = 1 - B$,

-continued $$f_{corr}(\overrightarrow{RGB}, i) = R - \max(G, B) \text{ for } i = 0 \text{ and } R \geq \max(G, B)$$
$$= 0 \quad \text{for } i = 0 \text{ and } R < \max(G, B)$$
$$= G - \max(R, B) \text{ for } i = 1 \text{ and } G \geq \max(R, B)$$
$$= 0 \quad \text{for } i = 1 \text{ and } G < \max(R, B)$$
$$= B - \max(R, G) \text{ for } i = 2 \text{ and } B \geq \max(R, G)$$
$$= 0 \quad \text{for } i = 2 \text{ and } B < \max(R, G)$$
$$= C - \max(M, Y) \text{ for } i = 3 \text{ and } C \geq \max(M, Y)$$
$$= 0 \quad \text{for } i = 3 \text{ and } C < \max(M, Y)$$
$$= M - \max(C, Y) \text{ for } i = 4 \text{ and } M \geq \max(C, Y)$$
$$= 0 \quad \text{for } i = 4 \text{ and } M < \max(C, Y)$$
$$= Y - \max(C, M) \text{ for } i = 5 \text{ and } Y \geq \max(C, M)$$
$$= 0 \quad \text{for } i = 5 \text{ and } Y < \max(C, M)$$

In order to define the desired color appearance using the ECA method, a device dependent example such as an RGB display is considered that can be approximated by a Matrix model. Later, a more generalized approach can be defined that is entirely device independent. This initial demonstration will seek to create a profile which is chromatically adapted from some arbitrary media white point $XYZ_{WP}$ to $XYZ_{D50}$ using the above method in lieu of using Bradford or some other similar transform.

Let $M_{D50}$ be the matrix in this illustrative example for converting RGB→XYZ for an RGB display with white point $XYZ_{D50}$ and let $M_{WP}$ be the matrix for converting RGB→XYZ for the same RGB display set to a white point of $XYZ_{WP}$. According to the ECA method, RGB→XYZ is characterized by matrix $M_{D50}$ after adaptation has been performed on the XYZ values of the $XYZ_{WP}$ display for colors in the vicinity of R=G=B. Likewise, according to the ECA method, RGB→XYZ is characterized by $M_{WP}$ in regions near the extremes of R,G,B,C,M,Y.

The values of XYZ for the white shifted display that has been adapted according to the ECA method should have the following expression:

$$\overrightarrow{XYZ}_{adapt} = \overrightarrow{XYZ} + \Delta \overrightarrow{XYZ}(\overrightarrow{RGB}) \quad \text{Eq. 11}$$

$$= \overrightarrow{XYZ} + \sum_{i=0}^{i=5} \Delta \overrightarrow{XYZ}_i(1.0 - f_{corr}(\overrightarrow{RGB}, i))$$

$$= M_{WP}\overrightarrow{RGB} + \sum_{i=0}^{i=5} (M_{D50} - M_{WP})$$

$$\overrightarrow{RGB}_i(1.0 - f_{corr}(\overrightarrow{RGB}, i))$$

$\overrightarrow{RGB}_i = (1, 0, 0)$ for $i = 0$
$= (0, 1, 0)$ for $i = 1$
$= (0, 0, 1)$ for $i = 2$
$= (0, 1, 1)$ for $i = 3$
$= (1, 0, 1)$ for $i = 4$
$= (1, 1, 0)$ for $i = 5$ The resulting XYZ as a function of RGB is piecewise linear in nature. The function above cannot be characterized via simple matrix transform since it supports up to 18 independent corrections ($\Delta X, \Delta Y, \Delta Z$ for 6 color directions R,G,B,C,M,Y) whereas the matrix transform can only support 6 independent corrections (essentially $\Delta x \Delta y$ for R,G, and B due to the fact that RGB must always sum to D50 after adaptation is performed). The function above fulfills the requirement that R=G=B is neutral, i.e. is a scalar times $XYZ_{50}$ and that XYZ approaches the matrix $M_{WP}$ the RGB in the vicinity of the extremes of R,G,B,C,M,Y.

To relate the above expression to chromatic adaptation as defined in equation 4, we can write:

$$\vec{XYZ}_{adapt} = M_{adapt}(\vec{XYZ})\vec{XYZ} \qquad \text{Eq. 12}$$

$$M_{adapt}(\vec{XYZ}) = \left[ M_{WP} + (M_{D50} - M_{WP}) \sum_{i=0}^{i=5} \vec{RGB}_i \left(1.0 - f_{corr}(M_{WP}^{-1}\vec{XYZ}, i)\right) \right] M_{WP}^{-1}$$

Selective Linear Correction Via the Triple Matrix Calculation

An alternative embodiment of the invention utilizes 3 matrices, one for each of 3 sectors in RGB space—the 3 sectors lying between R/G, G/B, and B/R. The matrices are defined in order to fulfill two requirements: each matrix must ensure that a) the value of XYZ for the two most dominant primaries is equal to the value of XYZ for those colors at the white point (wp) of the non-D50 system and, b) must also ensure that the white point for each matrix is the white to which you are adapting (e.g., typically D50). This is achieved by calculating a modified value for the third non-dominant primary color as described below.

If matrix $M_{wp}$ defines the values of XYZ for R, G, and B at a white point defined by $(x_{wp}, y_{wp})$:

$$M_{wp} = \begin{pmatrix} X_{Rwp} & X_{Gwp} & X_{Bwp} \\ Y_{Rwp} & Y_{Gwp} & Y_{Bwp} \\ Z_{Rwp} & Z_{Gwp} & Z_{Bwp} \end{pmatrix} \qquad \text{Eq. 13}$$

A matrix, $M_{iD50}$, is created where i=0, 1, 2 referring to the sectors R/G, G/B, and B/R. For i=0, the current values for blue of $XYZ_{Bwp}=(X_{Bwp}, Y_{Bwp}, Z_{Bwp})$ are replaced with values that ensure a D50 white point. This can be ensured by calculating the following modified values for $XYZ_{Bwp}$ as follows:

$$\vec{XYZ}_{BD50} = \vec{XYZ}_{D50} - \vec{XYZ}_{Rwp} - \vec{XYZ}_{Gwp} \qquad \text{Eq. 14}$$

In the same manner, the values for $XYZ_{RD50}$ (for the i=1 or G/B sector) and $XYZ_{GD50}$ (for the i=2 or B/R sector) can be determined for the i=1 and i=2 matrices for the Red and Green colors.

The simple calculation from this approach is as follows:

$$\vec{XYZ}_{E\_adapt} = M_{iD50}(M_{wp}^{-1}\vec{XYZ}) \qquad \text{Eq. 15}$$
$$= M_{iD50}\vec{RGB}$$

where $i = 0$ for $R \geq B$ and $G \geq B$ $i = 1$ for $G \geq R$ and $B \geq R$ $i = 2$ for $R \geq G$ and $B \geq G$ The above formalism is convenient for the following reason: one can begin with an RGB color space that is similar to the RGB space of the display device for which one desires to calculate chromatic adaptation. One can then generalize to larger or different RGB or cone spaces such as Adobe RGB, LMS, Bradford, etc.

Estimating the Contamination, α, of the Blue Channel Z

Although the above discussed color adaptation techniques provide good results, it was observed that yellow colors in particular were over-corrected with the above methods. For example, if the media white shifted red, the Bradford approach permitted yellow colors to shift in the red direction as well. By contrast, the ECA of the present invention attempts to preserve the original XYZ values for a saturated yellow. Visually, this appears too green. So whereas Bradford appeared to "undercorrect" yellows, allowing them to become too red, the ECA method appears to "overcorrect" yellows, making them too green.

This phenomenon could be explained by making the assumption that the CIE definition of the $Z(\lambda)$ human observer function is lacking accuracy when attempting to model the actual eye+brain sensation of color. If one studies the Hunt-Pointer-Estevez matrix for use in converting XYZ to LMS and LMS to XYZ (via the inverse matrix), one observes that the spectral response of $Z(\lambda)$ depends almost entirely on the short wavelength cone response of the eye $S(\lambda)$. The implication of this assumption is that colors ranging from neutral white to saturated yellow have a similar dynamic range as colors ranging from neutral to saturated red, etc.

If instead it is assumed that $Z(\lambda)$ has a strong non-blue component contributed from the medium wavelength cone response, $M(\lambda)$, this would imply a much smaller dynamic range for colors ranging from neutral to yellow. Thus, saturated yellows would be considered as less fully saturated than other colors such as reds. This would result in a partial correction of yellows using ECA technique of the invention.

A simple method was used to estimate the magnitude of α contamination of blue (Z) channel by non-blue wavelengths. Revisiting the expression for ECA above and writing the similar expression for standard Von Kries adaptation using RGB→XYZ matrices $M_{wp}$ and $M_{D50}$ rather than the standard equation 4 using the standard matrix $M_{XYZ \rightarrow RGB}$:

$$\vec{XYZ}_{VK\_adapt} = M_{D50}(M_{wp}^{-1}\vec{XYZ}) \qquad \text{Eq. 16}$$

It can be shown that this expression is equivalent to the more common expression for Von Kries adaptation using Bradford or other cone matrix M:

$$\vec{XYZ}_{VK\_adapt} = M^{-1} \frac{M\vec{XYZ}_{D50}}{M\vec{XYZ}_{wp}} (M\vec{XYZ}) \qquad \text{Eq. 17}$$

where $$M_{wp}^{-1} = \begin{pmatrix} 1/R_{wp} & 0 & 0 \\ 0 & 1/G_{wp} & 0 \\ 0 & 0 & 1/B_{wp} \end{pmatrix} M \qquad \text{Eq. 18}$$

$$\vec{RGB}_{wp} = M\vec{XYZ}_{wp}$$

and $$M_{D50} = M^{-1} \begin{pmatrix} R_{D50} & 0 & 0 \\ 0 & G_{D50} & 0 \\ 0 & 0 & B_{D50} \end{pmatrix} \qquad \text{Eq. 19}$$

$$\vec{RGB}_{D50} = M\vec{XYZ}_{D50}$$

So whereas, normally the matrices used in RGB matrix profiles are identified as matrix $M_{wp}$ for converting RGB→XYZ for white point $(x_{wp}, y_{wp})$, we note the convention that chromatic adaptation matrices M generally convert XYZ→RGB$_{cone}$.

Having defined the Von Kries adapted values of XYZ, the contamination, $\alpha$, is now defined as a reduction factor to indicate the incomplete transition from adapted→non-adapted due to the incomplete transition from neutral→non-neutral. This equates to an incomplete transition from von Kries to ECA and can be written as:

$$\vec{XYZ}_{adapted} = (1.0-\alpha)\vec{XYZ}_{E\_adapt} + \alpha\vec{XYZ}_{VK\_adapt} \qquad \text{Eq. 20}$$

The value of $\alpha=0$ for all colors except colors near yellow. To permit the incomplete non-adaptation of yellow, the following estimate for $\alpha$ is used in one embodiment:

$\alpha = \alpha_0 G/R$ for $R \geq G \geq B$ $\alpha = \alpha_0 R/G$ for $G \geq R \geq B$ $\alpha = 0$ for $B \geq R$ and $B \geq G$ \qquad Eq. 21

The above ensures that $\alpha$ approaches $\alpha_0$ as the ratio of R/G approaches 1.0 and approaches 0.0 as the ratio of either R/G or G/R approach 0.0.

Using this simple estimate for reducing the magnitude of transition from adapted to non-adapted XYZ for yellows, it was determined that the apparent contamination of tristimulous Z resulting in a reduced transition for yellow is quite large—on the order of 40%-50%. The following results of blind tests comparing the invention's ECA approach and the prior art Bradford approach were performed using a value of 50% for $\alpha_0$.

Testing ECA with Contamination, $\alpha$, of the Blue Channel $Z(\lambda)$ vs. Bradford A test was performed with 6 subjects at 3 remote locations to confirm a statistically significant improvement of ECA vs. the prior art Bradford approach. The test comprised of comparing RGB images with shifted white points for all permutations of –15, 0, +15 for a* and b*.

In each case, pairs of images from opposite directions of white point shift were compared to each other to assess whether there was a good visual similarity between them despite the noticeable differences in white point. Subjects were encouraged to "pretend" these images were printed on papers of different color, such as pastel blue, pastel pink, etc. The pairs of images were chromatically adapted from the different white points to D50 using Bradford and the ECA using the triple matrix method and $\alpha_0=50\%$.

The chromatically adapted images were created as follows:

1) A Bradford profile was created by chromatically adapting the xy chromaticities for R,G, B from XYZ$_{WP}$ to XYZ$_{D50}$ Bradford using equation 4 above.

2) An ECA profile with $\alpha_0=50\%$ contamination of $Z(\lambda)$ was created by chromatically adapting the XYZ values of shifted white to D50 according to the expressions defined in equations 7 and 10 above.

3) The original image was duplicated and converted from Trinitron RGB at D50 (to minimize effects of gamut clipping during comparisons) to each chromatically adapted profile.

4) The two converted images were then assigned a non-chromatically adapted profile for the shifted white point display and were converted via absolute rendering to AdobeRGB (it was confirmed that this result is identical to adjusting the relative magnitudes of RGB to achieve the white point shift, simulating the process of calibrating the display to various white points).

The pairs of images above were given anonymous identifiers and assessed by the subjects. In each assessment, the subjects were asked to determine which pair representing the same white point shifts were more similar to one another. The results of the blind test indicated a 100% agreement by the 6 independent subjects at 3 locations that the appearance of all 4 pairs of images adapted using ECA with $\alpha_0=50\%$ matched one another significantly better than the pairs of images adapted using the prior art Bradford approach.

Redefinition of $Z(\lambda)$

The conversion from XYZ to LMS published by Hunt is as follows:

XYZ→RGB Hunt-PointerEstevez

|   | X | Y | Z |
| --- | --- | --- | --- |
| L | 0.38971 | 0.68898 | −0.07868 |
| M | −0.22981 | 1.1834 | 0.04641 |
| S | 0 | 0 | 1 |

The inverse matrix of the above defines the conversion from LMS to XYZ:

|   | L | M | S |
| --- | --- | --- | --- |
| X | 1.910196834 | −1.112123893 | 0.201907957 |
| Y | 0.370950088 | 0.629054257 | −8.05514E-06 |
| Z | 0 | 0 | 1 |

The implication of the $\alpha_0$ contamination of $Z(\lambda)$ by the medium wavelength cone response $M(\lambda)$ is that the improved definition of $Z(\lambda)$ in terms of the cone responses LMS can be indicated by a new LMS to XYZ conversion matrix:

|   | L | M | S |
| --- | --- | --- | --- |
| X | 1.910196834 | −1.112123893 | 0.201907957 |
| Y | 0.370950088 | 0.629054257 | −8.05514E-06 |
| Z | 0 | $\alpha_0$ | $1 - \alpha_0$ |

Impact of Method for Redefining $Z(\lambda)$

The above redefinition of $Z(\lambda)$ results in a new set of tristimulous values which for differentiation purposes will be referred to as EdgeXYZ. EdgeXYZ has a significant impact on the calculated values of CIELAB and therefore on the calculated values of $\Delta E$ when comparing colors. This in turn will impact the results of most gamut mapping methods, which base their calculations on CIELAB or other XYZ-based color appearance models. In particular, the improved definition of $Z(\lambda)$ will result in much smaller values of $\Delta E$ resulting from errors in the direction of yellow/blue. Thus, with optimal choice of the value of $\alpha_0$, one should confirm that color differences of 1 $\Delta E$ in the direction of yellow-blue, will have similar visual magnitude of difference as differences of 1 $\Delta E$ in the direction of red-green. This will greatly simplify calculations of $\Delta E$ and improve results of gamut mapping based on $\Delta E$.

Thus, the method of creating EdgeXYZ rather than CIEXYZ from LMS can be used as follows:

1) Colors can be uniquely defined using EdgeXYZ rather than CIEXYZ resulting in new values of L*a*b*.

2) In the example of saturated spot colors used in printing such as Pantone™, these newly defined values will result in a better visual match when these colors are out of gamut relative to CMYK inks used for printing, if the ICC profile for the printer is also created using EdgeXYZ vs. CIEXYZ. This is because the fundamental metric used to estimate color difference, which is ΔE, will be a much more representative indicator of the actual visual difference. Hence, the actual visual difference between spot colors and CMYK colors can be minimized more effectively.

3) Likewise, more effective color reproduction can be performed between different devices and media, in particular when converting images from larger color gamuts such as AdobeRGB to smaller gamuts such as CMYK SWOP due to the fact that the metric for quantifying color difference (ΔE) based on EdgeXYZ is more representative of actual visual differences than ΔE based on CIEXYZ.

4) When defining colors specifications for single colors or for paints, tolerances can be much more consistent since a value of 1 ΔE based on EdgeXYZ will indicate more consistent visual differences than ☐E based on CIEXYZ.

5) For digital photography and for the entertainment industry, color conversions using L*a*b* based on EdgeXYZ rather than CIEXYZ will result in better mappings from actual scenes where the range of colors can be quite significant compared to the limited gamuts of digital RGB projectors and HDTV. For example, a bright yellow neon light in a scene, which may be near the extreme outer gamut of the visual system, can be more effectively mapped to the colors available for a digitally projected movie, or images that are digitally created on film.

Referring now to FIG. 1, there is shown a block diagram illustrating an exemplary operating environment for application of the chromatic adaptation technique(s) previously discussed above in accordance with an embodiment of the invention. In particular, FIG. 1 shows a general purpose-computing environment 100 comprising a processor 102, memory 104, user interface 106, source-imaging device 108 and destination imaging device 110. Processor 102 may execute chromatic adaptation using the techniques discussed previously above.

Source imaging device 108 and destination imaging device 110 may be display devices or printers. Alternatively, source-imaging device 108 may be an image capture device such as a scanner or camera. In either case, source imaging device 108 and destination imaging device 110 operate according to an applicable set of device-dependent coordinates. As an example, source imaging device 108 may be an image capture device that produces source device data defined by RGB coordinates, while destination imaging device 110 may be a printer that produces destination device data defined by CMYK coordinates. Memory 104 can include both volatile (e.g., RAM) and nonvolatile (e.g., ROM) storage and can store all of the previously discussed characterization and correction techniques.

User interface 106 may include a display device, such as a cathode ray tube (CRT), liquid crystal display (LCD), plasma display, digital light processing (DLP) display, or the like, for presentation of output to a user. In addition, user interface 106 may include a keyboard and pointing device, such as a mouse, trackball or the like to support a graphical user interface. In operation, a user interacts with processor 102 via user interface 106 to direct conversion of source device data to destination device data. Memory 104 stores process-readable instructions and data for execution by processor 102. The instructions include program code that implement the chromatic adaptation techniques described herein. Processor 102 may operate in any of a variety of operating systems, such as Windows, Mac OS, Linux, Unix, etc.

Processor 102 may take the form of one or more general-purpose microprocessors or microcontrollers, e.g., within a PC or MAC computer or workstation. In an alternative embodiment, the processor 102 may be implemented using one or more digital signal processors (DSPs), application specific integrated circuits (ASICs), field programmable logic arrays (FPGAs), or any equivalent integrated or discrete logic circuitry, or any combination thereof. Memory 104 may include or utilize magnetic or optical tape or disks, solid state volatile or non-volatile memory, including random access memory (RAM), read only memory (ROM), electronically programmable memory (EPROM or EEPROM), or flash memory, as well as other volatile or non-volatile memory or data storage media.

Figure 2:
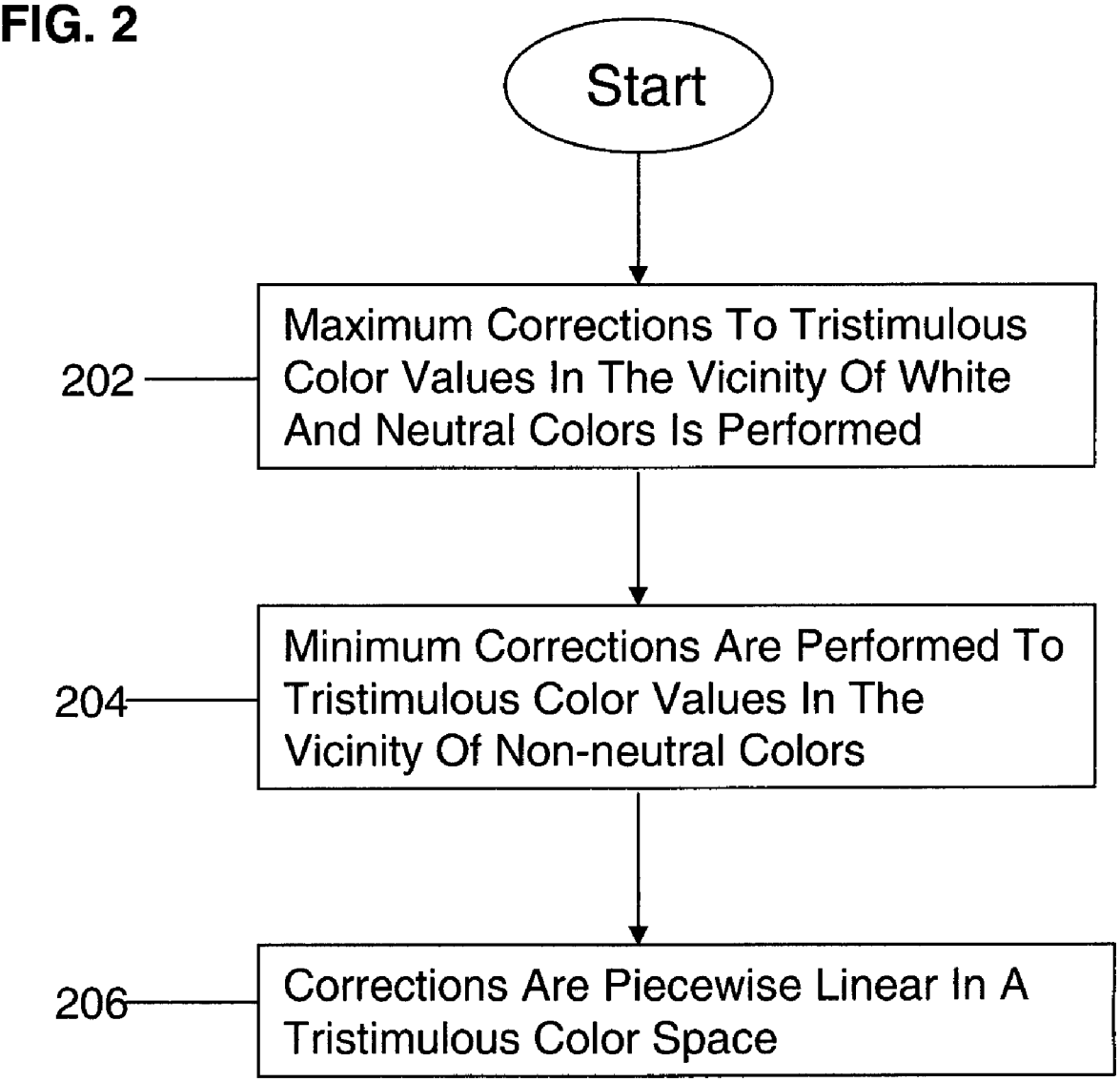
FIG. 2 shows a flowchart highlighting one embodiment of the invention.

In FIG. 2, there is shown a flowchart highlighting another embodiment of the invention. In 202, maximum corrections to tristimulous color values in the vicinity of white and neutral colors are performed. In 204, minimum corrections are performed to tristimulous color values in the vicinity of non-neutral colors and in 206, the corrections are piecewise linear in a tristimulous color space.

The invention has been described in detail with particular reference to certain preferred embodiments thereof, but it will be understood that variations and modifications can be effected within the scope of the invention.

The invention claimed is:

1. A method for performing chromatic adaptation, comprising:

performing maximum chromatic corrections to tristimulous color values in the vicinity of white and neutral colors;

performing minimum chromatic corrections to tristimulous color values in the vicinity of non-neutral colors;

wherein said corrections are piecewise liner in a tristimulous color space;

wherein the corrections to the tristimulous color space are performed in a Red-Green-Blue (RGB) color space that comprises a linear transformation of the tristimulous color space; and further comprising:

applying a correction factor, α, which is equal to zero for all colors except colors near yellow, the correction factor is determined as follows:

$$\alpha = \alpha_0 G/R \text{ for } R \geq G \geq B;$$

$$\alpha = \alpha_0 R/G \text{ for } G \geq R \geq B;$$

$$\alpha = 0 \text{ for } B \geq R \text{ and } B \geq G; \text{ and}$$

wherein said correction factor is calculated on a controller.

2. A method as defined in claim 1, wherein the tristimulous color space comprises a Red-Green-Blue (RGB) color space, and further comprising:

utilizing three matrices one for each sector in the RGB color space, the three sectors lying between the boundaries between R/G, G/B and B/R.

3. A method as defined in claim 2, wherein each of the three matrices ensures that a value of XYZ for the two most dominant primary colors is equal to the value of XYZ for those colors at a white point of a non-D50 system.

4. A method as defined in claim 1, wherein a correction function applied to the tristimulous corrections is performed such that an adjustment for R is minimum for R=1.0, G=B=0 and scales linearly to 1 as RGB approaches the boundaries R=0, R=G=B, R=G with B=0, and R=B with G=0.

5. A method as defined in claim 4, wherein the partitioning for G and B is performed in a similar fashion as that done for R.

6. A method as defined in claim 1, wherein:
forming a matrix for each sector formed between the R/G, G/B and B/R boundaries, with each matrix that is formed ensuring that the value of XYZ for the two most dominant primary colors is equal to the value of XYZ for those colors at a white point for a non-D50 system.

7. A method as defined in claim 1, wherein the corrections are performed using the following equation:

$$\vec{XYZ}_{adapt} = \vec{XYZ} + \Delta\vec{XYZ}(\vec{RGB})$$

$$\Delta\vec{XYZ}(\vec{RGB}) = \sum_{i=0}^{i=5} \Delta\vec{XYZ}_i(1.0 - f_{corr}(\vec{RGB}, i))$$

$$\text{define } C = 1 - R, M = 1 - G, Y = 1 - B,$$

$$\begin{aligned}
f_{corr}(\vec{RGB}, i) &= R - \max(G, B) \text{ for } i = 0 \text{ and } R \geq \max(G, B) \\
&= 0 \qquad\qquad \text{ for } i = 0 \text{ and } R < \max(G, B) \\
&= G - \max(R, B) \text{ for } i = 1 \text{ and } G \geq \max(R, B) \\
&= 0 \qquad\qquad \text{ for } i = 1 \text{ and } G < \max(R, B) \\
&= B - \max(R, G) \text{ for } i = 2 \text{ and } B \geq \max(R, G) \\
&= 0 \qquad\qquad \text{ for } i = 2 \text{ and } B < \max(R, G) \\
&= C - \max(M, Y) \text{ for } i = 3 \text{ and } C \geq \max(M, Y) \\
&= 0 \qquad\qquad \text{ for } i = 3 \text{ and } C < \max(M, Y) \\
&= M - \max(C, Y) \text{ for } i = 4 \text{ and } M \geq \max(C, Y) \\
&= 0 \qquad\qquad \text{ for } i = 4 \text{ and } M < \max(C, Y) \\
&= Y - \max(C, M) \text{ for } i = 5 \text{ and } Y \geq \max(C, M) \\
&= 0 \qquad\qquad \text{ for } i = 5 \text{ and } Y < \max(C, M).
\end{aligned}$$

8. A method as in claim 1, wherein said controller is selected from a group comprising a microprocessor, a microcontroller, a digital signal processor, application specific integrated circuits, field programmable logic arrays, or combinations thereof.

9. A method for performing chromatic adaptation, comprising:
performing maximum chromatic corrections to tristimulous color values in the vicinity of white and neutral colors;
performing minimum chromatic corrections to tristimulous color values in the vicinity of non-neutral colors;
wherein said corrections are piecewise linear in a tristimulous color space;
wherein the corrections to the tristimulous color space are performed in a Red-Green-Blue (RGB) color space that comprises a linear transformation of the tristimulous color space; and
wherein the corrections are performed using the following equation:

$$\vec{XYZ}_{E\_adapt} = M_{iD50}(M_{wp}^{-1}\vec{XYZ})$$

$$= M_{iD50}\vec{RGB}$$

where $i = 0$ for $R \geq B$ and $G \geq B$ $i = 1$ for $G \geq R$ and $B \geq R$ $i = 2$ for $R \geq G$ and $B \geq G$; and wherein said corrections is calculated on a controller.

10. A system, comprising:
a display; and
a controller coupled to the display, wherein the controller performs a chromatic adaptation that yields a color profile for the display wherein:

$$\vec{XYZ}_{adapt} = \vec{XYZ} + \Delta\vec{XYZ}(\vec{RGB})$$

$$= \vec{XYZ} + \sum_{i=0}^{i=5} \Delta\vec{XYZ}_i(1.0 - f_{corr}(\vec{RGB}, i))$$

$$= M_{WP}\vec{RGB} + \sum_{i=0}^{i=5}(M_{D50} - M_{WP})$$

$$\vec{RGB}_i(1.0 - f_{corr}(\vec{RGB}, i))$$

$$\begin{aligned}
\vec{RGB}_i &= (1, 0, 0) \text{ for } i = 0 \\
&= (0, 1, 0) \text{ for } i = 1 \\
&= (0, 0, 1) \text{ for } i = 2 \\
&= (0, 1, 1) \text{ for } i = 3 \\
&= (1, 0, 1) \text{ for } i = 4 \\
&= (1, 1, 0) \text{ for } i = 5
\end{aligned}$$

where $M_{D50}$ is a matrix for converting RGB to XYZ for the display set to a white point of D50, and $M_{WP}$ is a matrix for converting RGB to XYZ for the display set to a white point of $XYZ_{WP}$.

11. A system as defined in claim 10, wherein the controller performs chromatic adaptation by:
performing maximum corrections to tristimulous color values in the vicinity of white and neutral colors;
performing minimum corrections to tristimulous color values in the vicinity of non-neutral colors; and
wherein said corrections are piecewise linear in the tristimulous color space.

12. A system as defined in claim 10, wherein the correction by the controller is performed using the following equation:

$$\vec{XYZ}_{adapt} = \vec{XYZ} + \Delta\vec{XYZ}(\vec{RGB})$$

$$\Delta\vec{XYZ}(\vec{RGB}) = \sum_{i=0}^{i=5} \Delta\vec{XYZ}_i(1.0 - f_{corr}(\vec{RGB}, i))$$

$$\text{define } C = 1 - R, M = 1 - G, Y = 1 - B,$$

$$\begin{aligned}
f_{corr}(\vec{RGB}, i) &= R - \max(G, B) \text{ for } i = 0 \text{ and } R \geq \max(G, B) \\
&= 0 \qquad\qquad \text{ for } i = 0 \text{ and } R < \max(G, B) \\
&= G - \max(R, B) \text{ for } i = 1 \text{ and } G \geq \max(R, B) \\
&= 0 \qquad\qquad \text{ for } i = 1 \text{ and } G < \max(R, B) \\
&= B - \max(R, G) \text{ for } i = 2 \text{ and } B \geq \max(R, G) \\
&= 0 \qquad\qquad \text{ for } i = 2 \text{ and } B < \max(R, G) \\
&= C - \max(M, Y) \text{ for } i = 3 \text{ and } C \geq \max(M, Y) \\
&= 0 \qquad\qquad \text{ for } i = 3 \text{ and } C < \max(M, Y) \\
&= M - \max(C, Y) \text{ for } i = 4 \text{ and } M \geq \max(C, Y) \\
&= 0 \qquad\qquad \text{ for } i = 4 \text{ and } M < \max(C, Y) \\
&= Y - \max(C, M) \text{ for } i = 5 \text{ and } Y \geq \max(C, M) \\
&= 0 \qquad\qquad \text{ for } i = 5 \text{ and } Y < \max(C, M).
\end{aligned}$$

13. A system as defined in claim 10, wherein the correction by the controller is performed using the following equation:

$$\overrightarrow{XYZ}_{E\_adapt} = M_{iD50}\left(M_{wp}^{-1}\overrightarrow{XYZ}\right)$$
$$= M_{iD50}\overrightarrow{RGB}$$

where $i = 0$ for $R \geq B$ and $G \geq B$ $i = 1$ for $G \geq R$ and $B \geq R$ $i = 2$ for $R \geq G$ and $B \geq G$.

14. A method as defined in claim 10, wherein the controller applies a correction factor, α, which is equal to zero for all colors except colors near yellow, the correction factor is determined as follows:

α=α₀G/R for R≧G≧B;

α=α₀R/G for G≧R≧B; and

α=0 for B≧R and B≧G.

15. A system for performing color adaptation, comprising:
a memory;
a processor coupled to the memory, the processor providing color adaptation by:
performing maximum corrections to tristimulous color values in the vicinity of white and neutral colors;
performing minimum corrections to tristimulous color values in the vicinity of non-neutral colors;
wherein said corrections are piecewise linear in the tristimulous color space;
further comprising:
corrections to the tristimulous color space are performed by the processor in an Red-Green-Blue (RGB) color space that is a linear transformation of the tristimulous color space; and
wherein the corrections are performed by determining:

$$\overrightarrow{XYZ}_{E\_adapt} = M_{iD50}\left(M_{wp}^{-1}\overrightarrow{XYZ}\right)$$
$$= M_{iD50}\overrightarrow{RGB}$$

where $i = 0$ for $R \geq B$ and $G \geq B$ $i = 1$ for $G \geq R$ and $B \geq R$ $i = 2$ for $R \geq G$ and $B \geq G$.

\* \* \* \* \*